(12) United States Patent
Adear et al.

(10) Patent No.: US 12,367,530 B2
(45) Date of Patent: Jul. 22, 2025

(54) AUTOMATICALLY DETECTING DATA ANOMALIES USING ARTIFICIAL INTELLIGENCE TECHNIQUES

(71) Applicant: Dell Products L.P., Round Rock, TX (US)

(72) Inventors: Norbert Adear, Beer Sheva (IL); Abhishek Sharma, Berlin (DE); Prateek Srivastava, Cedar Park, TX (US); Luis Arturo Perez, Austin, TX (US); Rajesh Kumar, Bangalore (IN); Eoin Fitzgerald, Galway (IE); Anvesh Kalia, Round Rock, TX (US); Devisha Gupta, Kanpur (IN); Karol Bocko, Bratislava (SK); John Denton, Paige, TX (US); Rosalind Granado, Austin, TX (US); Manjunatha B, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 125 days.

(21) Appl. No.: 18/332,444

(22) Filed: Jun. 9, 2023

(65) Prior Publication Data
US 2024/0412298 A1 Dec. 12, 2024

(51) Int. Cl.
*G06Q 40/12* (2023.01)
(52) U.S. Cl.
CPC .................................. *G06Q 40/123* (2013.12)
(58) Field of Classification Search
CPC .................................................... G06Q 40/123
(Continued)

(56) References Cited

U.S. PATENT DOCUMENTS

2007/0094181 A1* 4/2007 Tayebnejad ............ G06Q 40/08
706/21
2020/0327621 A1* 10/2020 Gomes ...................... G06N 3/08
(Continued)

OTHER PUBLICATIONS

MLFlow.org, MLFlow Documentation, https://web.archive.org/web/20230601185031/https://mlflow.org/docs/latest/index.html , Jun. 1, 2023.
(Continued)

*Primary Examiner* — Hai Tran
(74) *Attorney, Agent, or Firm* — Ryan, Mason & Lewis, LLP (57) ABSTRACT

Methods, apparatus, and processor-readable storage media for automatically detecting data anomalies using artificial intelligence techniques are provided herein. An example computer-implemented method includes obtaining data pertaining to multiple tasks associated with at least one enterprise; detecting one or more data anomalies by predicting one or more values within the obtained data by processing at least a portion of the obtained data using one or more artificial intelligence techniques, and comparing the one or more predicted values to one or more corresponding portions of the obtained data; generating one or more data recommendations associated with at least a portion of the one or more detected data anomalies; and performing one or more automated actions based at least in part on at least one of the one or more detected data anomalies and the one or more generated data recommendations.

20 Claims, 5 Drawing Sheets

(58) Field of Classification Search
USPC .......................................................... 705/31
See application file for complete search history.

(56) References Cited

U.S. PATENT DOCUMENTS

| | | | | |
|---|---|---|---|---|
| 2021/0082062 | A1* | 3/2021 | Hurd | G06Q 40/123 |
| 2022/0114437 | A1* | 4/2022 | Watt | G06N 3/042 |
| 2023/0394592 | A1* | 12/2023 | Gomes | G06Q 40/123 |
| 2024/0193138 | A1* | 6/2024 | Linsey | G06F 16/215 |
| 2024/0241867 | A1* | 7/2024 | Nirantar | G06F 16/215 |

OTHER PUBLICATIONS

Tannor, P., Deepchecks.com, Data Drift vs. Concept Drift, https://deepchecks.com/data-drift-vs-concept-drift-what-are-the-main-differences/ , Oct. 6, 2021.

* cited by examiner

AUTOMATICALLY DETECTING DATA ANOMALIES USING ARTIFICIAL INTELLIGENCE TECHNIQUES

FIELD

The field relates generally to information processing systems, and more particularly to techniques for anomaly detection in such systems.

BACKGROUND

With increasing digitization of transactions and/or other data processing tasks, a variety of compliance and accuracy-related issues can arise. However, conventional data anomaly detection approaches commonly include resource-intensive partial dataset analyses, which typically result in unidentified data anomalies and possible issues and/or penalties related thereto.

SUMMARY

Illustrative embodiments of the disclosure provide techniques for automatically detecting data anomalies using artificial intelligence techniques.

An exemplary computer-implemented method includes obtaining data pertaining to multiple tasks associated with at least one enterprise, and detecting one or more data anomalies by predicting one or more values within the obtained data by processing at least a portion of the obtained data using one or more artificial intelligence techniques, and comparing the one or more predicted values to one or more corresponding portions of the obtained data. The method also includes generating one or more data recommendations associated with at least a portion of the one or more detected data anomalies, and performing one or more automated actions based at least in part on at least one of the one or more detected data anomalies and the one or more generated data recommendations.

Illustrative embodiments can provide significant advantages relative to conventional data anomaly detection approaches. For example, problems associated with resource-intensive partial dataset analyses are overcome in one or more embodiments through automatically detecting data anomalies using artificial intelligence techniques and generating recommendations based at least in part thereon.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
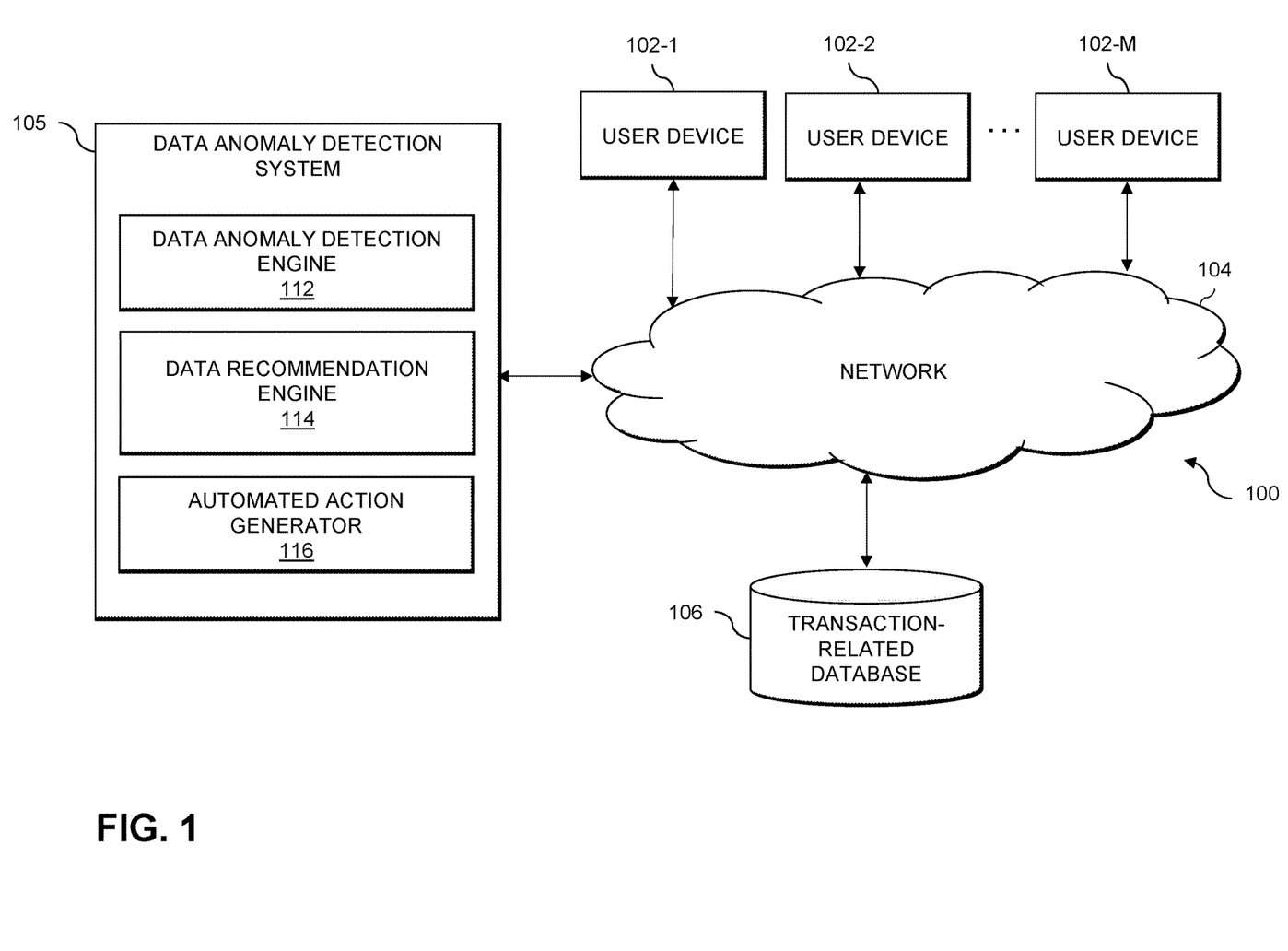
FIG. 1 shows an information processing system configured for automatically detecting data anomalies using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is data anomaly detection system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, data anomaly detection system 105 can have an associated transaction-related database 106 configured to store data pertaining to multiple transactions, which comprise, for example, user data, product and/or service data, address information, temporal information, enterprise information, etc.

The transaction-related database 106 in one or more embodiment is implemented using one or more storage systems associated with data anomaly detection system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with data anomaly detection system 105 can be one or more input-output devices, which illustratively comprise keyboards, pointers, displays or other types of input-output devices in any combination. Such input-output devices can be used, for example, to support one or more user interfaces to data anomaly detection system 105, as well as to support communication between data anomaly detection system 105 and other related systems and devices not explicitly shown.

Additionally, data anomaly detection system 105 in the FIG. 1 embodiment is assumed to be implemented using at least one processing device. Each such processing device generally comprises at least one processor and an associated memory, and implements one or more functional modules for controlling certain features of data anomaly detection system 105.

More particularly, data anomaly detection system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows data anomaly detection system 105 to communicate over the network 104 with the user devices 102, and illustratively comprises one or more conventional transceivers.

The data anomaly detection system 105 further comprises data anomaly detection engine 112, data recommendation engine 114, and automated action generator 116.

It is to be appreciated that this particular arrangement of elements 112, 114 and 116 illustrated in the data anomaly detection system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically detecting data anomalies using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, data anomaly detection system 105 and transaction-related database 106 can be on and/or part of the same processing platform.

An exemplary process utilizing elements 112, 114 and 116 of an example data anomaly detection system 105 in computer network 100 will be described in more detail with reference to the flow diagram of FIG. 3.

Accordingly, at least one embodiment includes automatically detecting one or more data anomalies using artificial intelligence techniques. By way merely of illustration, one or more example embodiments described herein include implementation in connection with detecting and validating harmonized system nomenclature (HSN) code anomalies in intelligent tax systems. Such an example embodiment can include obtaining data from multiple sources (for example, one or more internal enterprise sources and/or one or more external sources related to users, products, sales, etc.) and processing at least a portion of such data using one or more artificial intelligence models built and/or trained for data validation, anomaly detection, and automated classification (e.g., with respect to one or more tax codes such as HSN codes) to enrich and/or improve tax reporting.

In at least one embodiment, such artificial intelligence models can include one or more machine learning models and/or one or more deep learning models, trained to detect anomalies in particular types of data (e.g., HSN codes, value-added tax identification numbers (VAT IDs), etc.) and/or recommend correct versions of data associated with detected data anomalies. Such model outputs can, for example, facilitate increased compliance across various entities and/or contexts (e.g., one or more tax domains). One or more embodiments can also include outputting and/or displaying (e.g., to one or more users via one or more user interfaces) at least a portion of any detected data anomalies and/or recommended corrections for further processing (e.g., tax management, tax forecasting, etc.) and/or model training.

Accordingly, as further detailed herein, at least one example embodiment can include detecting one or more anomalous HSN categorizations, suggesting and/or recommending one or more corrected and/or alternate HSN codes on a transactional level, and publishing one or more reports of detected transactional anomalies for one or more users and/or one or more separate automated systems to review and validate at least a portion of the HSN codes in question. Such review and/or validation can also be leveraged to further train and/or fine-tune the one or more models (e.g., one or more machine learning models and/or one or more deep learning models) used to detect the data anomalies.

In detecting one or more data anomalies, one or more embodiments can include, for example, detecting one or more incorrect HSN codes. In such an example context, an enterprise can sell products and/or services to users, resulting in possible discrepancies such as taxation values, user identifiers (IDs), product categorizations, address information, etc. Such discrepancies can, for example, result in penalties for the enterprise, resource wastage, user experience issues, etc.

Accordingly, such an embodiment can include training and implementing a data anomaly detection system driven by at least one feed-forward neural network model which uses dependent features (such as, e.g., "PRODUCT_CODE," "DESCRIPTION," etc.) to learn relevant data classifications and/or categorizations (e.g., HSN product classifications with "HSN_CODES") as a dependent variable. Such a multi-class classification model can be built and/or trained, for example, to identify misclassifications in HSN codes by comparing predicted HSN codes against documented HSN codes (e.g., the HSN codes printed on the relevant invoices) and generate a report identifying only those misclassified transactions tagged as anomalies.

Additionally, one or more embodiments include suggesting and/or recommending corrected and/or modified data associated with detected data anomalies (e.g., correct HSN codes). By training one more machine learning models (e.g., one or more random forests, XGBoost, and/or one or more neural networks) using data associated with a large number of enterprise transactions, such an embodiment can learn and/or understand data patterns in, for example, assigning an HSN code to a given transaction description and highlight misclassified HSN code transactions. By way merely of example, such an embodiment can include training at least one neural network to understand one or more underlying relationships between product codes and product descriptions. and predict correct HSN codes based at least in part thereon. If such a prediction is anomalous, the confidence for the model will lie below a certain threshold, set dynamically, to map model performance over time and initiate subject matter expert review. Further, as detailed herein, such an embodiment can also include displaying at least a portion of such model output(s) to provide one or more users an opportunity to preview and remedy an incorrect HSN codes in connection with the suggested and/or recommended code(s) generated by the model(s).

In connection with at least one embodiment which includes identifying data anomalies associated with transactions using at least one neural network model, the predicted HSN codes (e.g., predicted by the at least one neural network) are used as the suggested HSN codes for correction, which can be leveraged by one or more users and/or one or more automated systems to evaluate the best possible HSN for at least one given transaction.

One or more embodiments can include implementing machine learning model management, model and data versioning, model evaluation, and model comparison. For example, such an embodiment can include building a machine learning flow-based model monitoring setup (e.g., using Airflow and/or MLflow) to track model performance over at least one given period of time to identify model drifting. In such an embodiment, because there can be an overlap between keywords for both of the independent features (e.g., product code and product description), a data drift would imply a change in relationship. Also, the mapping of at least one HSN code might have changed against at least one given product code and/or product description, and this might lead to a degradation in model performance. A data scientist could then, for example, use such data to understand the underlying issue and/or determine the presence of concept drift and/or data drift.

Also, in such an embodiment, one or more directed acyclic graphs (DAGs) can be created and implemented to manage one or more tasks such as, e.g., fetching data from one or more data application programming interfaces (APIs), automated model re-training, etc. At least one embodiment can additionally include generating modular detection deployment code, which can deploy multiple models simultaneously. In such an embodiment, this modularity can be leveraged to ascertain a benefit from running multiple models and only using the one(s) which produce(s) the best results in deployment. Also, if a re-trained model is not better with respect to a given key performance indicator (KPI) such as, for example, accuracy, the latest version of the model can be precluded from use in deployment.

Figure 2:
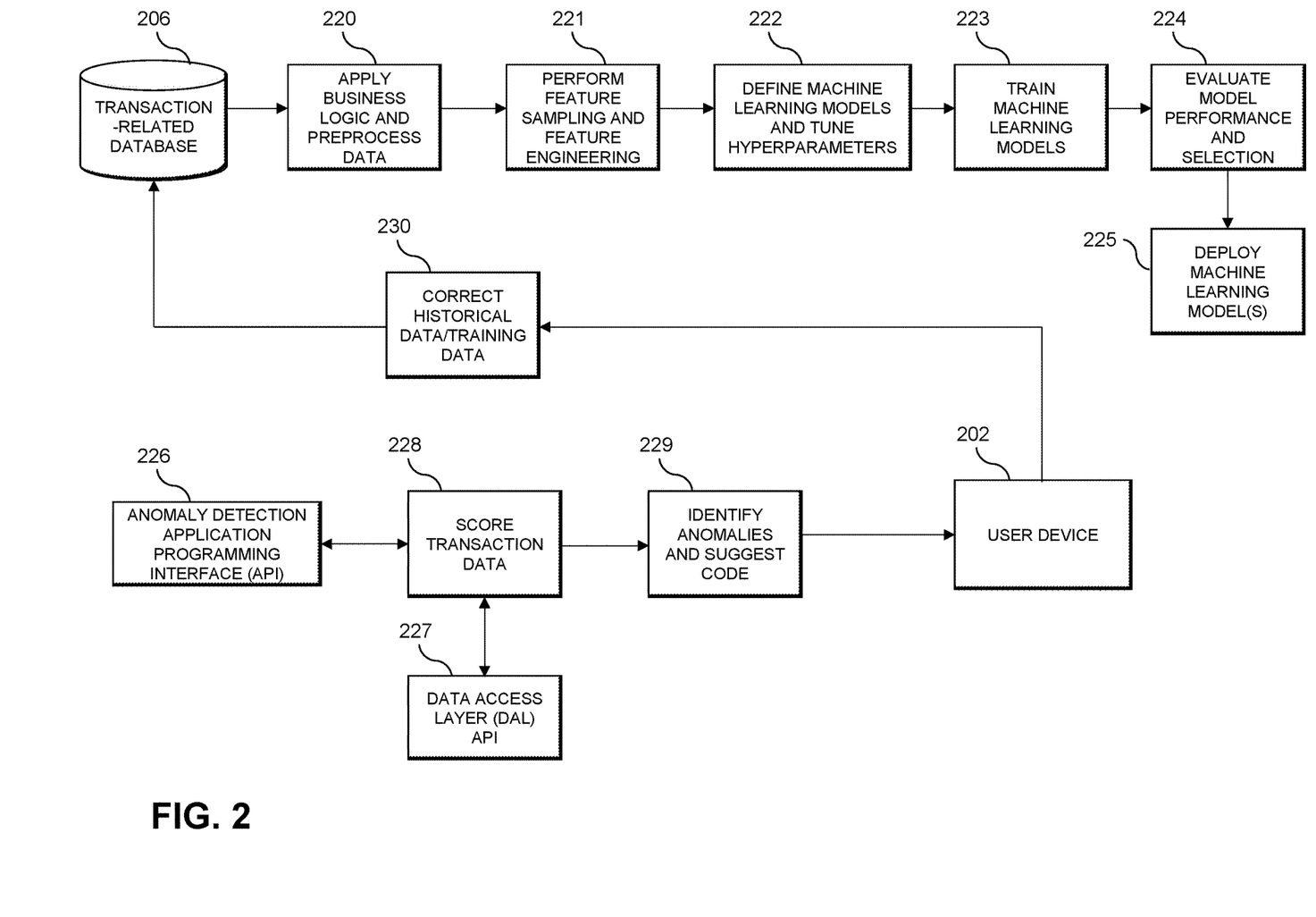
FIG. 2 shows an example machine learning-based data anomaly detection model workflow in an illustrative embodiment.

FIG. 2 shows an example machine learning-based data anomaly detection model workflow in an illustrative embodiment. By way of illustration, FIG. 2 depicts a model training workflow and a data anomaly prediction workflow. As seen as part of the data anomaly prediction workflow, anomaly detection API 226, which downloads the trained machine learning model and preprocessing pipelines, and data access layer (DAL) API 227, which extracts data for anomaly detection, are used to preprocess at least a portion of such data and score HSN transactions in step 228. Based at least in part on the output(s) of step 228, step 229 includes identifying one or more anomalous transactions and suggesting one or more corresponding HSN codes. The suggested HSN code(s) can then be published in a report (e.g., an intelligence tax system report) onto user device 202 for user review. Based at least in part on the given use case, one or more users can review the anomaly detection results along with one or more suggested corrected HSN codes. The one or more suggested corrected HSN codes generated by the machine learning model can also be used to corrected historical data and/or training data in step 230 to be used to further train the machine learning model and/or be routed to one or more structured query language (SQL) database tables.

In connection with the model training workflow of FIG. 2, the machine learning model is trained using historical data from transaction-related database 206, leveraging data from anomaly detection outputs. In one or more embodiments, machine learning model training codes and/or templates are developed with reusability in mind. In furtherance of the above-noted modularity aspects, such an embodiment can include building codes with an emphasis on reusability. Data processing can take place independently of model training and/or inference, which helps in debugging and facilitating implementation of other models, if necessary. For example, at least one such reusable model template can have a class defined with multiple methods such as, e.g., obtaining training data, data preprocessing, performing one or more sampling techniques, model training and optimization, model validation, model training status check, model selector, model drift and/or monitoring functionality, and moving the model to staging post evaluation.

Referring again to the model training workflow of FIG. 2, step 220 includes fetching data from transaction-related database 206 and applying business logic and one or more data preprocessing techniques to at least a portion of the data. In one or more embodiments, the business logic is defined based at least in part on various factors such as, for example, whether the given product is a baseline product or a bundled product. For a baseline product, the HSN of the given product is applied. For example, a baseline product might include, e.g., laptops, monitors, hard disks, etc. For a bundled product, the HSN of the main item in the bundled product can be applied. For instance, a bundled product can include laptops or servers that are customized based on one or more user requirements, etc. With respect to example business logic, because an objective of one or more embodiments is to predict an HSN code and identify the correctness of the predicted HSN code, if there is a baseline product line item transaction (e.g., a laptop and/or a monitor separately purchased), then the HSN code should correspond to the baseline item only. However, if the transaction contains a bundle of products (e.g., a laptop with a mouse and an additional keyboard), then the HSN code that is tagged can be that of the main baseline item (in this example, the Laptop), which needs to be correctly mapped for that transaction and not the HSN code(s) of the other bundled products.

Subsequent to step 220, step 221 includes performing feature sampling and feature engineering (e.g., to render the data in at least one required format) on at least a portion of the data received from the transaction-related database 206. In one or more embodiments, feature sampling can facilitate synthetically simulating similar data automatically. For example, consider a use case involving 150 different HSN codes, and sufficient data is needed to train the machine learning model to understand one or more data patterns associated with each of the 150 HSN codes. Assume, for instance, that considerable transaction-related training data exists for approximately 50 of these HSN codes, whereas comparatively less transaction-related training data exists for the other 100 HSN codes. For such cases, feature sampling can be carried out to synthetically simulate similar data, which can then be used in training the machine learning model. Also, as part of step 221, feature engineering can include determining what data are needed to transform so that HSN codes can be defined (e.g., search for a product that is being sold most frequently, etc.).

Additionally, step 222 includes using the engineered data to define multiple machine learning models and tune hyperparameters of the multiple machine learning models. Step 223 then includes model training using identified hyperparameters and model metrics logging. Such a step can include, for example, experimenting with various datasets and determining which dataset includes the best fitting hyperparameter(s) and using that dataset further. By way merely of example, such hyperparameters can include the number of layers of the neural network, hidden network size, dropout value for regularization, etc. In one or more embodiments, hyperparameter tuning is carried out using an artificial neural network model, which can be further used in step 224 to evaluates the model performance and model selection (while reducing training time). At least one selected and evaluated machine learning model can then be deployed, via step 225, as an API (e.g., anomaly detection API 226, detailed herein) for batch predictions and/or data anomaly detections.

Referring to the anomaly prediction workflow of FIG. 2, consider an illustrative use case wherein the machine learning model trained as detailed above is implemented to detect one or more non-compliant and/or mislabeled HSN codes in transaction data. For example, anomaly detection API 226 and DAL API 227 can connect to at least one SQL database, a data pull request can be initiated in connection with the DAL API 227, and the fetched data can be saved in a given format and fed to the machine learning model (trained as detailed above). Scoring, such as carried out in step 228, and matching can take place based at least in part on the model prediction(s). For example, if the predicted HSN code and the corresponding invoice printed HSN are different, an anomaly is detected and identified by the machine learning model in step 229. The machine learning model, as part of step 229, also suggests the correct and/or appropriate HSN code (e.g., based on the predicted HSN code and/or historical data) and outputs such a suggestion as well as the detected anomaly to user device 202.

In one or more embodiments, new HSN codes and/or HSN codes that are appearing and/or being processed for the first time (with respect to the machine learning model) are identified and marked as new products not present in the database(s). Users can then make judgments pertaining to such HSN codes, and based at least in part thereon, the machine learning model can be trained using the new HSN codes.

Additionally or alternatively, users can review the data anomalies detected by the machine learning model as well as the recommendations related thereto. At least a part of the user-reviewed data can then merge, as shown in step 230 of FIG. 2, with historical data in transaction-related database 206 based at least in part on data feature patterns. Such merged data can then be used, for example, for future model retraining instances to drive towards more accurate model outputs (and, for example, a more compliant tax system for the given enterprise).

Also, in one or more embodiments, model outputs can be presented to one or more users via one or more user interfaces using color-coded icons to signify, e.g., that a given HSN code is wrong or detected otherwise as an anomaly, and that the HSN code should be validated by a user. The user can then review the model output and select the original HSN code, select a suggested HSN code generated as part of the model output, or select a custom HSN code by entering such a code.

By way merely of example, in an illustrative use case, an enterprise can implement one or more embodiments in support of one or more tax teams in connection with improving and/or enhancing compliance and accuracy of tax filings and/or tax reporting (for example, by validating and/or suggesting the correct HSN code(s) for each of multiple transactions). In such an illustrative use case, one or more embodiments can also include generating and displaying (e.g., via one or more interfaces) commodity code task dashboards which provide a synopsis of reviewed commodity codes (e.g., HSN codes), including highlighting any commodity codes that are pending review.

It is to be appreciated that some embodiments described herein utilize one or more artificial intelligence models. It is to be appreciated that the term "model," as used herein, is intended to be broadly construed and may comprise, for example, a set of executable instructions for generating computer-implemented predictions and/or recommendations. For example, one or more of the models described herein may be trained to generate predictions and/or recommendations based on transaction data collected from various data sources (e.g., data sources associated with one or more enterprises and/or one or more users associated therewith), and such predictions and/or recommendations can be used to initiate one or more automated actions (e.g., remedying one or more portions of incorrect transaction data, automatically adjusting at least one reference source for classifying and/or categorizing transaction data, automatically training and/or tuning one or more artificial intelligence models associated with generating such predictions and/or recommendations, etc.).

Figure 3:
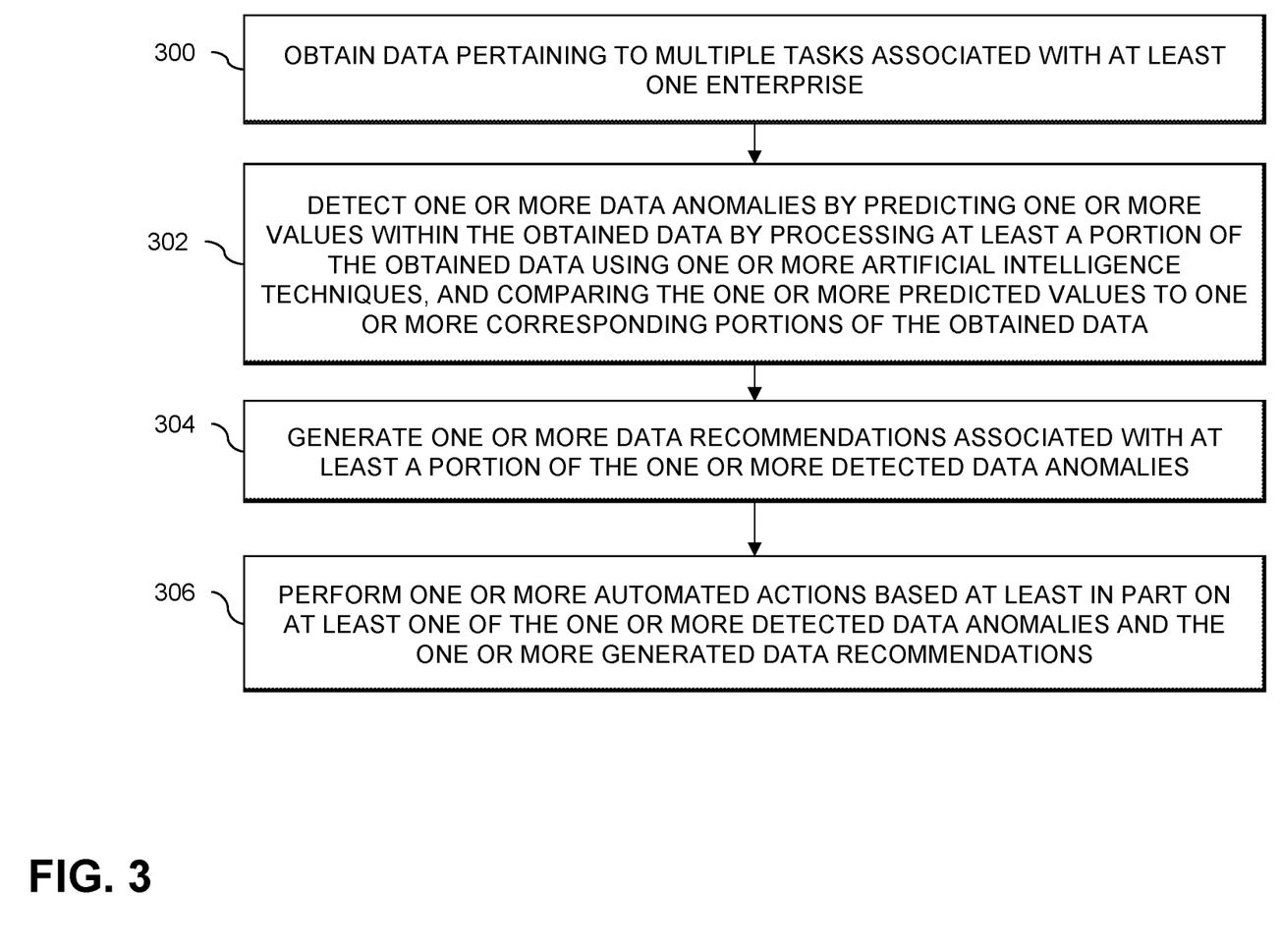
FIG. 3 is a flow diagram of a process for automatically detecting data anomalies using artificial intelligence techniques in an illustrative embodiment.

FIG. 3 is a flow diagram of a process for automatically detecting data anomalies using artificial intelligence techniques in an illustrative embodiment. It is to be understood that this particular process is only an example, and additional or alternative processes can be carried out in other embodiments.

In this embodiment, the process includes steps 300 through 306. These steps are assumed to be performed by data anomaly detection system 105 utilizing elements 112, 114 and 116.

Step 300 includes obtaining data pertaining to multiple tasks associated with at least one enterprise. In at least one embodiment, obtaining data pertaining to multiple tasks associated with at least one enterprise includes obtaining tax-related data pertaining to multiple transactions associated with the at least one enterprise.

Step 302 includes detecting one or more data anomalies by predicting one or more values within the obtained data by processing at least a portion of the obtained data using one or more artificial intelligence techniques, and comparing the one or more predicted values to one or more corresponding portions of the obtained data. In one or more embodiments, detecting one or more data anomalies can include processing at least a portion of the obtained data using at least one feed-forward neural network model, wherein the at least one feed-forward neural network model uses multiple features to learn one or more data classifications as a dependent variable. Also, in one or more embodiments, detecting one or more data anomalies can include processing at least a portion of the obtained data using one or more machine learning-based random forest algorithms.

Step 304 includes generating one or more data recommendations associated with at least a portion of the one or more detected data anomalies. In at least one embodiment, generating one or more data recommendations includes outputting the one or more predicted values as the one or more data recommendations.

Step 306 includes performing one or more automated actions based at least in part on at least one of the one or more detected data anomalies and the one or more generated data recommendations. In one or more embodiments, performing one or more automated actions includes replacing at least a portion of the one or more detected data anomalies with at least a portion of the one or more generated data recommendations. Additionally or alternatively, performing one or more automated actions can include modifying at least one data source related to at least a portion of the multiple tasks associated with the at least one enterprise. Also, in at least one embodiment, performing one or more automated actions includes automatically training at least a portion of the one or more artificial intelligence techniques using feedback related to at least one of the one or more detected data anomalies and the one or more generated data recommendations. Further, in one or more embodiments, performing one or more automated actions can include outputting at least one of the one or more detected data anomalies and the one or more generated data recommendations to at least one of one or more users and one or more external systems for review and validation.

Additionally, the techniques depicted in FIG. 3 can also include implementing at least one machine learning flow-based model monitoring framework to track performance of the one or more artificial intelligence techniques over at least one given period of time with respect to model drifting.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically detect data anomalies using artificial intelligence techniques. These and other embodiments can effectively overcome problems associated with resource-intensive partial dataset analyses.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
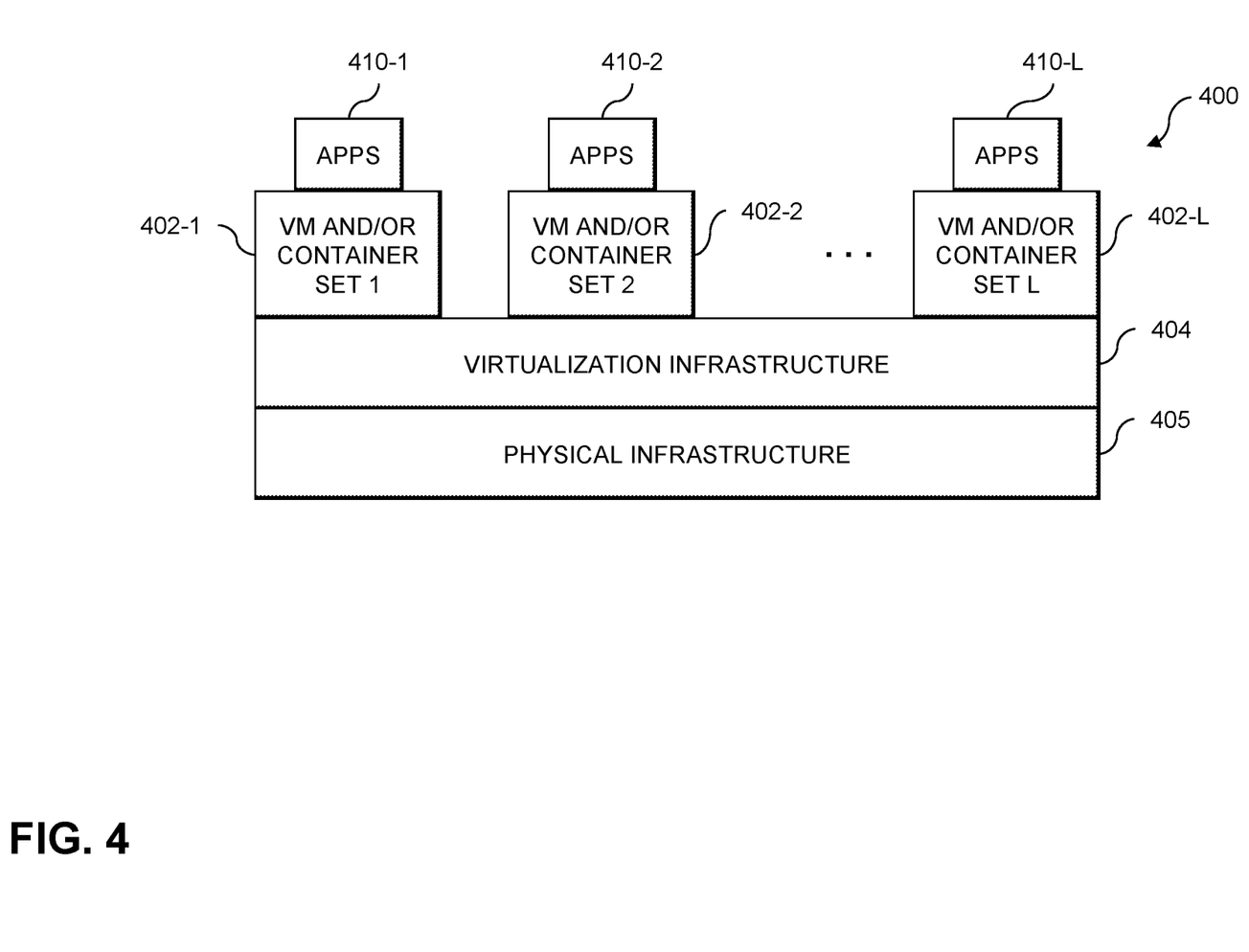
FIGS. 4 and 5 show examples of processing platforms that may be utilized to implement at least a portion of an information processing system in illustrative embodiments.
Figure 5:
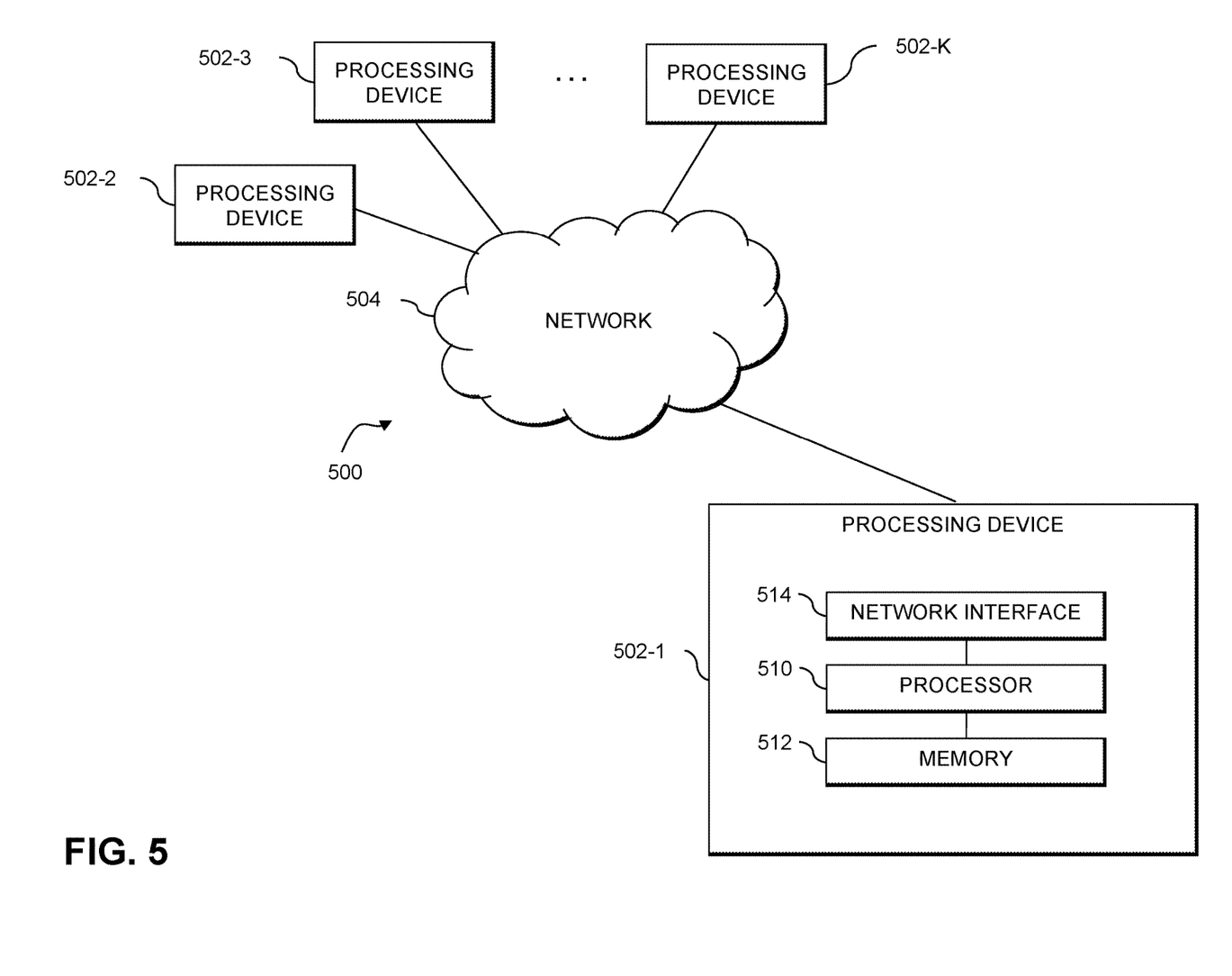

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2 . . . 410-L running on respective ones of the VMs/container sets 402-1, 402-2 . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, wherein the hypervisor platform has an associated virtual infrastructure management system. The underlying physical machines comprise one or more information processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a CPU, a GPU, a TPU, a microcontroller, an ASIC, a FPGA or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining data pertaining to multiple tasks associated with at least one enterprise;
    detecting one or more data anomalies by predicting one or more values within the obtained data by processing at least a portion of the obtained data using at least one feed-forward neural network model, and comparing the one or more predicted values to one or more corresponding portions of the obtained data;
    generating one or more data recommendations associated with at least a portion of the one or more detected data anomalies; and
    performing one or more automated actions based at least in part on at least one of the one or more detected data anomalies and the one or more generated data recommendations, wherein performing one or more automated actions comprises replacing anomalous data associated with the one or more detected data anomalies with replacement data based at least in part on the one or more generated data recommendations, at least in part by routing the replacement data to one or more structured query language databases associated with the at least one enterprise;
    wherein the method is performed by at least one processing device comprising a processor coupled to a memory.

2. The computer-implemented method of claim 1, wherein generating one or more data recommendations comprises outputting the one or more predicted values as the one or more data recommendations.

3. The computer-implemented method of claim 1, wherein the at least one feed-forward neural network model uses multiple features to learn one or more data classifications as a dependent variable.

4. The computer-implemented method of claim 1, wherein detecting one or more data anomalies comprises processing at least a portion of the obtained data using one or more machine learning-based random forest algorithms.

5. The computer-implemented method of claim 1, wherein performing one or more automated actions comprises modifying at least one data source related to at least a portion of the multiple tasks associated with the at least one enterprise.

6. The computer-implemented method of claim 1, wherein performing one or more automated actions comprises automatically training at least a portion of the at least one feed-forward neural network model using feedback related to at least one of the one or more detected data anomalies and the one or more generated data recommendations.

7. The computer-implemented method of claim 1, wherein performing one or more automated actions comprises outputting at least one of the one or more detected data anomalies and the one or more generated data recommendations to at least one of one or more users and one or more external systems for review and validation.

8. The computer-implemented method of claim 1, wherein obtaining data pertaining to multiple tasks associated with at least one enterprise comprises obtaining tax-related data pertaining to multiple transactions associated with the at least one enterprise.

9. The computer-implemented method of claim 1, further comprising:
    implementing at least one machine learning flow-based model monitoring framework to track performance of the at least one feed-forward neural network model over at least one given period of time with respect to model drifting.

10. A non-transitory processor-readable storage medium having stored therein program code of one or more software programs, wherein the program code when executed by at least one processing device causes the at least one processing device:
    to obtain data pertaining to multiple tasks associated with at least one enterprise;
    to detect one or more data anomalies by predicting one or more values within the obtained data by processing at least a portion of the obtained data using at least one feed-forward neural network model, and comparing the one or more predicted values to one or more corresponding portions of the obtained data;
    to generate one or more data recommendations associated with at least a portion of the one or more detected data anomalies; and
    to perform one or more automated actions based at least in part on at least one of the one or more detected data anomalies and the one or more generated data recommendations, wherein performing one or more automated actions comprises replacing anomalous data associated with the one or more detected data anomalies with replacement data based at least in part on the one or more generated data recommendations, at least in part by routing the replacement data to one or more structured query language databases associated with the at least one enterprise.

11. The non-transitory processor-readable storage medium of claim 10, wherein generating one or more data recommendations comprises outputting the one or more predicted values as the one or more data recommendations.

12. The non-transitory processor-readable storage medium of claim 10, wherein the at least one feed-forward neural network model uses multiple features to learn one or more data classifications as a dependent variable.

13. The non-transitory processor-readable storage medium of claim 10, wherein detecting one or more data anomalies comprises processing at least a portion of the obtained data using one or more machine learning-based random forest algorithms.

14. The non-transitory processor-readable storage medium of claim 10, wherein the program code when executed by the at least one processing device further causes the at least one processing device:

to implement at least one machine learning flow-based model monitoring framework to track performance of the at least one feed-forward neural network model over at least one given period of time with respect to model drifting.

15. An apparatus comprising:
at least one processing device comprising a processor coupled to a memory;
the at least one processing device being configured:
  to obtain data pertaining to multiple tasks associated with at least one enterprise;
  to detect one or more data anomalies by predicting one or more values within the obtained data by processing at least a portion of the obtained data using at least one feed-forward neural network model, and comparing the one or more predicted values to one or more corresponding portions of the obtained data;
  to generate one or more data recommendations associated with at least a portion of the one or more detected data anomalies; and
  to perform one or more automated actions based at least in part on at least one of the one or more detected data anomalies and the one or more generated data recommendations, wherein performing one or more automated actions comprises replacing anomalous data associated with the one or more detected data anomalies with replacement data based at least in part on the one or more generated data recommendations, at least in part by routing the replacement data to one or more structured query language databases associated with the at least one enterprise.

16. The apparatus of claim 15, wherein generating one or more data recommendations comprises outputting the one or more predicted values as the one or more data recommendations.

17. The apparatus of claim 15, wherein the at least one feed-forward neural network model uses multiple features to learn one or more data classifications as a dependent variable.

18. The apparatus of claim 15, wherein detecting one or more data anomalies comprises processing at least a portion of the obtained data using one or more machine learning-based random forest algorithms.

19. The apparatus of claim 15, wherein the at least one processing device is further configured:
  to implement at least one machine learning flow-based model monitoring framework to track performance of the at least one feed-forward neural network model over at least one given period of time with respect to model drifting.

20. The apparatus of claim 15, wherein performing one or more automated actions comprises modifying at least one data source related to at least a portion of the multiple tasks associated with the at least one enterprise.

* * * * *